July 15, 1952   N. JAWOROWSKI ET AL   2,603,429
FISHING APPARATUS
Filed Jan. 3, 1949   2 SHEETS—SHEET 1
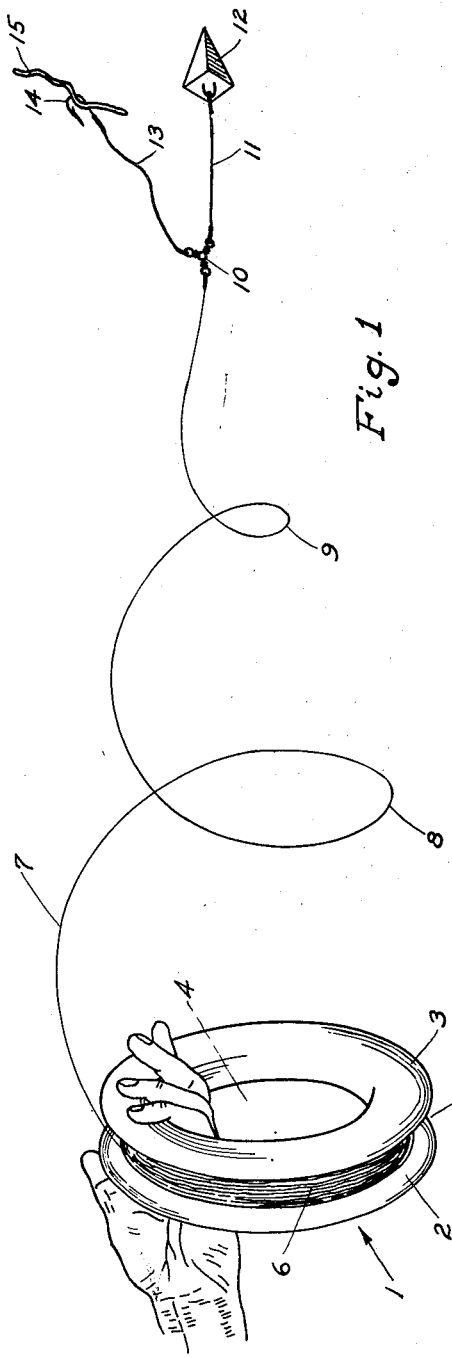
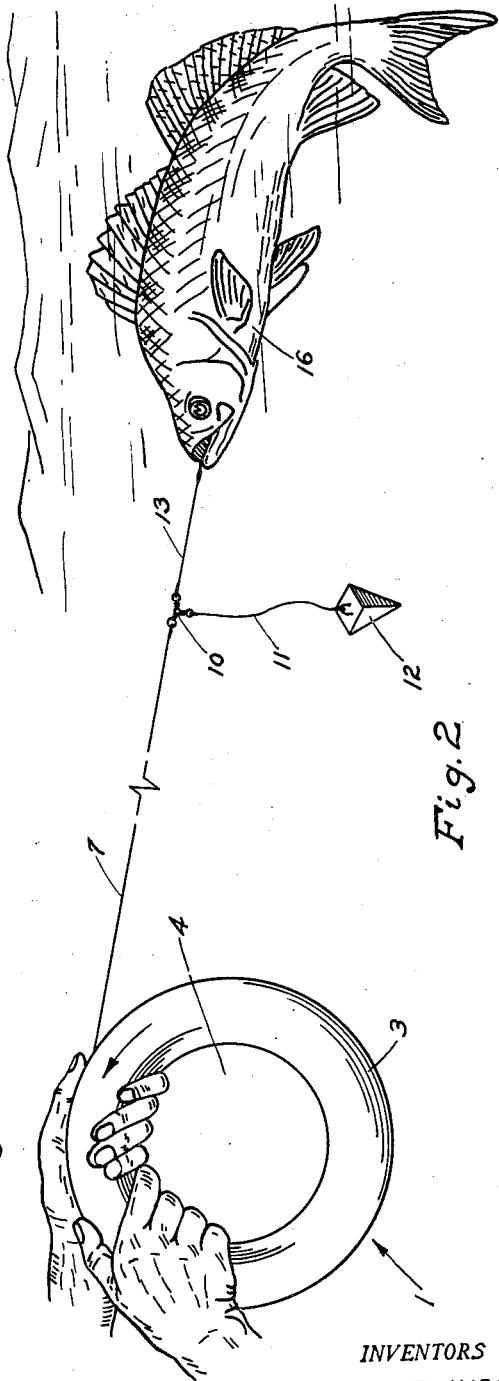
INVENTORS
NORBERT JAWOROWSKI
& JOSEPH F. JAWOROWSKI
BY Bosworth & Sessions
ATTORNEYS

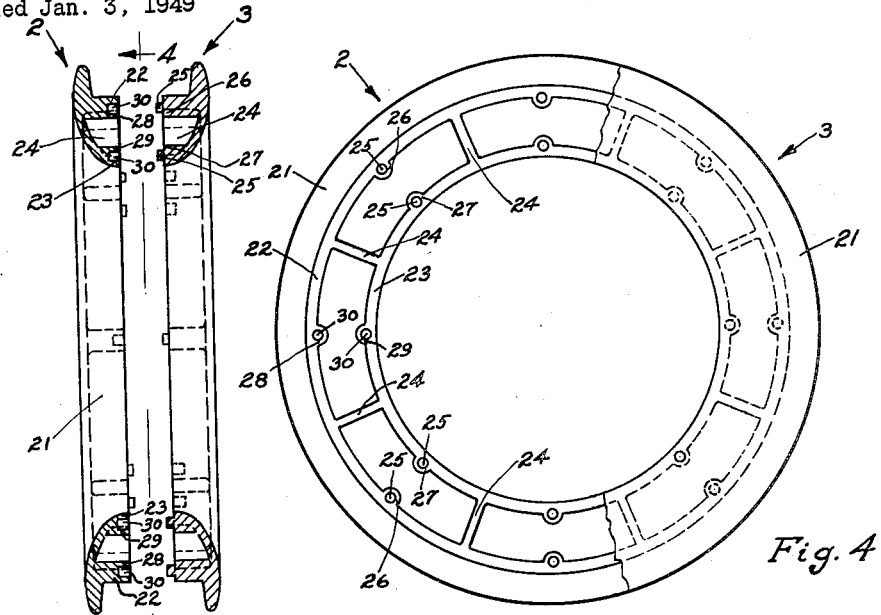
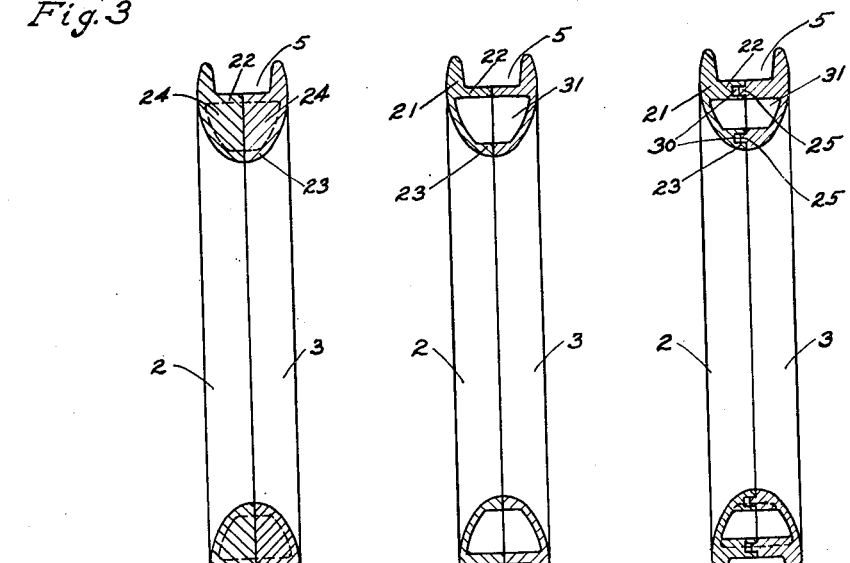
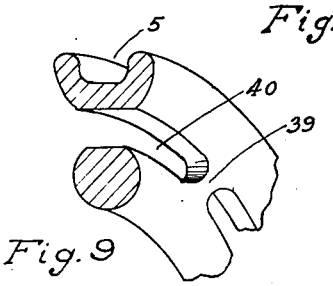
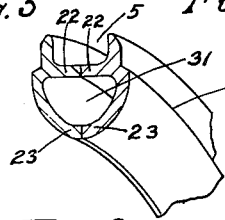

Patented July 15, 1952

2,603,429

UNITED STATES PATENT OFFICE 2,603,429

FISHING APPARATUS

Norbert Jaworowski, Lakewood, and Joseph F. Jaworowski, Cleveland, Ohio

Application January 3, 1949, Serial No. 68,794

6 Claims. (Cl. 242—96)

This invention relates to methods of and apparatus for casting a fishing line, controlling the flight of the line, and retracting or retrieving the line after the cast has been made. More particularly, the invention relates to a line-holding and casting-control device from which the line may be permitted to unwind and slip off, without rotation of the device, in a direction generally parallel to the longitudinal axis of the device. Preferably, but not necessarily, the device takes the form of an annular spool member having a central opening permitting manipulation of the device by the user without interference from a rod or other auxiliary equipment of the kind usually employed.

The necessity of employing a rod and other cumbersome paraphernalia for casting has been virtually inescapable heretofore, particularly where a cast characterized by substantial distance has been in contemplation. Where a rod is employed for casting purposes, the distance attained is limited, in the first instance, as a result of the mass of the rod itself and in the second instance in consequence of the failure of the ordinary reel to permit free travel of the line. Apart from being cumbersome, such paraphernalia are usually of such weight as to cause them to sink in the event of dislodgment from the user's grasp, thus leading in most cases to loss of the equipment in the event the user loses his hold upon it. These objections are overcome by the present invention by the provision of methods of and apparatus for casting permitting a high degree of control over the cast while making use of equipment which, if lost, will float for a period sufficiently long to permit of its recovery.

One of the objects of the invention is therefore to provide methods of and apparatus for casting a fishing line, controlling the flight thereof, and retracting the line without using a rod or other cumbersome auxiliary equipment of the kind or kinds heretofore employed. Another object of the invention is to provide methods and apparatus permitting the ready exercise of braking action on the line, thereby facilitating accurate placement of the bait or lure. Another object of the invention is to provide a strong, sturdy, yet simple device that will stand up under hard usage without likelihood of deterioration, as by rusting, as the result of the corrosive action of salt water. Still another object of the invention is to provide a simple, inexpensive device without moving parts which can be so constructed as to permit it to float, which occupies a relatively small amount of space compared with the conventional rod and reel, and which can be manufactured inexpensively without elaborate forming, machining or assembling operations.

Other objects and advantages of the invention will be apparent from the following description and from the accompanying drawings, in which Figure 1 is a perspective illustrating in diametric fashion the method of using the device of the present invention, the operation illustrated there in being part of the casting procedure. Figure 2 is a perspective illustrating in diametric fashion the method of retracting the line after the cast has been successfully completed. Figure 3 is a transverse central section of the device with the two half-members shown as separated from each other in order to illustrate the manner of assembly. Figure 4 is a corresponding side elevation with the greater part of the device broken away for the purpose of showing the interior face of one of the half-members, the latter being represented as it appears from line 4—4 of Figure 3. Figure 5 is a transverse central section through the device taken in the plane of the connecting webs hereinafter described. Figure 6 is a like section taken at a point immediately beyond the connecting webs appearing in Figure 5. Figure 7 is a like section taken in the plane of the mating members connecting the two half-members. Figures 8 and 9 are fragmentary perspectives of modifications.

As illustrated in Figure 1, the rig preferably employed in the practice of the invention includes a spool-like member generally designated 1 consisting of two half-members 2 and 3 joined together in such manner as to provide a central opening 4 accommodating the user's hand. Formed in the periphery of spool member 1 is a radially inwardly extending line-receiving groove 5 in which is held coil 6, the latter being made up of a line 7 of conventional construction. As the cast is made, line 7 slips out of groove 5 and over the outer peripheral edge of spool member 1, forming a series of convolutions of diminishing magnitude represented by loops 8 and 9. At the far end of line 7 is a swivel ring assembly 10 to which is connected weight line 11, weight 12, and a leader 13 carrying a hook 14 and a bait or lure 15. The opposite end of the line; that is to say, the end on which coil 6 is built, is looped around and made fast to the body of spool member 1.

As best illustrated in Figures 3 and 4, spool member 1 consists of two half-members 2 and 3 which, as will appear, are identical in construction but adapted to form a substantially integral spool member. Inasmuch as half-members 2 and 3 are exactly alike, being preferably formed in the same way with the same equipment, the description which follows will concern principally the half-member designated 2; i. e., the half-member shown at the left in Figure 3. As generally indicated in Figures 3 and 4, half-member 2 consists of a generally annular shell 21 which is characterized by a smooth outer surface and, on the opposite face thereof, by two transversely extending concentric flanges 22 and 23. The generally annular space between concentric flanges 22 and 23 is bridged at intervals of 45° by radially extending integral webs 24, the same extending to the cleavage plane; i. e., the plane of the inner ends of flanges 22 and 23. Webs 24 are of the nature of reinforcements and are for the purpose of providing strength without adding greatly to the mass of half-member 2.

As shown in Figure 4, outer flange 22 and inner flange 23 are provided at intervals of 45° around the periphery of half-member 2 with pairs of mating members 26, 27 and 28, 29 which project toward each other within the generally annular space defined by flanges 22 and 23. The arrangement is such that each web 24 is flanked by a pair of mating members removed therefrom in a clockwise direction by 22½° and a pair of mating members removed therefrom in a counterclockwise direction by 22½°. Associated with each of mating members 26 and 27 is a pin 25; associated with each of mating members 28 and 29 is a pin-receiving recess 30. The pairs of mating members are staggered in the sense that one pair; viz., mating members 26 and 27, will have pins 25 associated with them while the next pair, proceeding either clockwise or counterclockwise, will have pin receiving recesses 30 formed therein. Thus pairs of mating members carrying pins are alternated with pairs of mating members carrying pin-receiving recesses.

Viewing half-member 2 from the inside face thereof, the same thus embodies eight transverse webs 24 extending from outer flange 22 to inner flange 23. Between each pair of webs 24 is a pair of mating members, together with suitable pins or the pin-receiving recesses associated therewith as above described. Around the periphery of half-member 2 will be four pairs of mating members 26, 27 carrying pins 25 and, alternating with them, four pairs of mating members 28, 29 carrying pin-receiving recesses 30. Like transverse webs 24, which are spaced from each other by an angle of 45°, adjacent pairs of mating members are spaced from each other by 45°, although the spacing between like pairs; that is to say, pairs having pins 25 or pin-receiving recesses 30 associated with them, will of course approximate 90°. By this disposition of the various pairs of mating members, it becomes possible to couple together indiscriminately in different angular relationships the two like half-members designated 2 and 3, which, even when so coupled, are similar in every respect except that in each half-member mating members 26, 27 carrying pins 25 will be located opposite and will coact with mating members 28, 29 having pin-receiving recesses 30 formed therein.

The construction of the spool member 1 when the two half-members are placed together in the manner described is indicated in Figures 5, 6 and 7. Between webs 24, which make up the greater part of the area cross-hatched in Figure 5, are the closed recesses 31 indicated in the corresponding portions of Figures 6 and 7. Such closed recesses extend through arcs of approximately 45°, this being the angular distance between webs 24. The presence of closed recesses 31 imparts to spool member 1 the light weight in relation to its size which enables it to float if it slips from the grasp of the user. Formed in the outer periphery of spool member 1 in the manner indicated in Figures 5, 6 and 7 is the line-receiving groove 5 to which reference has already been made and in which coil 6 is formed and held as above described.

The outside diameter of spool member 1 is conveniently of the order of 12 inches, although it may be more or less, while the diameter of the central opening therein is preferably not less than about three inches, the latter being about the minimum lending itself to introduction of the human hand. As a rough guide, the maximum outside diameter will not as a rule be more than about three times the diameter of the central opening. In practice, the latter will usually be somewhat greater than the radial depth of line-receiving groove 5 in the outer periphery of the spool member. As indicated in the drawings, the surface of spool member 1 will usually be smooth around the full circumference of the spool member, this being accomplished in the preferred embodiment of the invention by giving the annulus a generally elliptical cross-section the major axis of which is parallel to the annulus plane. The shape of line-receiving groove 5 appears to be susceptible of wide variation without adversely affecting the usefulness of the device.

Half-members 2 and 3 may be molded or otherwise formed in any desired manner. Conveniently they may be molded in colors, as, for example, of polystyrene, which has the advantages of strength, light weight, and low water-absorption characteristics. Other synthetic resins may be used instead, as may also various natural or synthetic rubbers. In either case, half-members 2 and 3 are bonded as by a suitable cement applied over the inner surfaces of annular flanges 22 and 23, on pins 25, and in pin-receiving recesses 30. Cements are commercially available which cause a fusing of polystyrene to give rise to a substantially integral body. When properly applied, such cements will seal the seams between half-members 2 and 3, thus preventing the ingress of water into the closed recesses between webs 24. If desired, however, spool member 1 may be solid, being molded or turned from wood without leaving any interior voids.

The exterior surface of spool member 1 may be given any desired shape, although a smooth contour of generally oval cross-section conforming to the grasp of the human hand is desirable. In the spool member shown in Figures 3 to 7, the contour is generally oval, however, this contour may be modified as indicated in Figure 8 to provide a shoulder 35 some distance below the edge of the spool member. The purpose of shoulder 35 is to provide locating means for the fingers, thus permitting the user to know that his fingers are not in the way of line 7 as it spirals off the periphery of spool-member 1. A somewhat similar modification is indicated in Figure 9, in which, in lieu of an elliptical contour, the contour is roughly that of an hour-glass, the web 39 at the waist of the hour-glass being interrupted by spaced holds 40 in which the fingers of the user may be inserted and by means of which spool member 1 may be rotated to retract line 7 under the tension imposed by the catch.

In operation, spool member 1 may be held in one hand as indicated in Figure 1 or allowed to lie flat on a level surface, the line 7 being drawn therefrom and cast in the desired direction by the user's free hand or hands. If spool member 1 is held in the left hand as indicated in Figure 1, line 7 is grasped in the right hand and cast forward with a minimum of drag in a direction substantially paralleling the axis of spool member 1. If necessary, as may be the case with an amputee, spool member 1 may be allowed to lie flat on a level surface and the line 7 cast therefrom by appropriate motion of one hand. Being symmetrical in shape, spool member 1 lends itself to use by either right-handed or left-handed persons and, after line 7 has been cast, may be gripped by one or both hands, may be placed around either arm, or, if desired, may be held between the user's knees.

The direction of cast will ordinarily be in the general direction of the axis of spool member 1, except when spool member 1 is allowed to lie flat on a level surface. If, as indicated in Figure 1, the spool member 1 is held in the left hand and the direction of cast parallels the axis of spool member 1, a braking action may be exercised by angling spool member 1 by an amount ranging up to 90°. As spool member 1 is angled, the resistance to unwinding of line 7 imposed by spool member 1 increases progressively, thus slowing down and eventually stopping the flight of the line. If the angle is increased to a full 90°, the line 7 ceases to strip from spool member 1. Casts of great accuracy may be made without difficulty and distances ranging up to 150, 200 or even 250 feet may readily be made, depending on the user, on the nature of the line, and on the number and nature of the parts forward of ring assembly 10; that is to say, weight line 11, weight 12, leader 13, and the bait or lure 15 on hook 14.

In retracting line 7 onto spool member 1, the latter is held in the 90° position and rotated manually by a hand-under-hand motion in the direction indicated by the arrow in Figure 2; that is to say, counterclockwise as there shown. Where fish of large size are being sought, it will usually be advantageous to have holds 40 (Figure 9) for the purpose of facilitating the hauling-in step and limiting the clockwise rotation that accompanies paying out of line 7. Where small fish are being sought, it is practicable to employ a spool member 1 which is devoid of holds, the spool member being allowed to rotate freely in the hands of the user in response to tension placed on line 7 by the catch 16 or, to bring in the catch, gripped firmly and rotated counterclockwise.

For some purposes it may be desirable to provide a solid cylindrical hub at the center of the spool member having at opposite ends thereof auxiliary grasping portions of a diameter of from three to five inches, preferably about four inches, on the outer peripheries of which may be formed knobs or knurled surfaces enabling the user to hold the spool member firmly in one hand or both hands, as may be desired. In such case the hub may be connected by a solid web to the annulus having therein line-receiving groove 5, giving the spool member as a whole a disc-like appearance. Alternatively, the hub may be joined to the annulus by two or more spokes, preferably three, in which case the grasping portions at the ends of the hub may be omitted.

It is apparent that modifications by way of simplification and, having reference to the particular construction shown in Figures 3 to 7, by way of elaboration may be made without difficulty. Certain of these changes have already been suggested, while others will undoubtedly suggest themselves to those skilled in the art to which the invention pertains. It is intended that the patent shall cover, by suitable expression in the appended claims, whatever features of patentable novelty reside in the invention.

What is claimed is:

1. Fishing apparatus comprising a hollow, buoyant spool member of generally toroidal contour having a line-receiving groove in its outer periphery and a central opening large enough to pass over the user's hand, said spool member being made up of two hollow half-members that are held in water-tight relation to each other when assembled to form the spool member.

2. Fishing apparatus comprising a hollow, buoyant spool member of generally toroidal contour having a line-receiving groove in its outer periphery and a central opening large enough to pass over the user's hand, said spool member being molded as two hollow half-members that are held in water-tight relation to each other when assembled to form the spool member.

3. Fishing apparatus comprising a hollow, buoyant spool member of generally toroidal contour having a line-receiving groove in its outer periphery and a central opening large enough to pass over the user's hand, said spool member being molded as two like half-members, each taking the form of a hollow shell, that are held in water-tight relation to each other when assembled to form the spool member.

4. Fishing apparatus as in claim 3 in which the hollow formed by the two half-members in the interior of the spool member is divided by radially extending webs into a plurality of separate compartments.

5. Fishing apparatus as in claim 4 in which mating members characterized by pins and pin-receiving recesses are located in the compartments between the radially extending webs.

6. Fishing apparatus as in claim 5 in which, in each half-member, the pins and pin-receiving recesses associated with the mating members are located in alternate relation to each other.

NORBERT JAWOROWSKI.
JOSEPH F. JAWOROWSKI.

REFERENCES CITED

The following references are of record in the file of this patent:

UNITED STATES PATENTS

| Number | Name | Date |
| --- | --- | --- |
| 1,016,783 | Schmucker | Feb. 6, 1912 |
| 1,408,261 | Brookhart | Feb. 28, 1922 |
| 1,464,623 | Lybeck | Aug. 14, 1923 |
| 1,890,945 | Hormel | Dec. 13, 1932 |
| 2,342,868 | King | Feb. 29, 1944 |